(12) United States Patent
Abiri et al.

(10) Patent No.: US 11,916,408 B2
(45) Date of Patent: Feb. 27, 2024

(54) WIRELESS POWER DELIVERY SYSTEMS AND METHODS OF DELIVERING WIRELESS POWER

(71) Applicant: GuRu Wireless, Inc., Pasadena, CA (US)

(72) Inventors: Behrooz Abiri, Pasadena, CA (US); Seyed Ali Hajimiri, Pasadena, CA (US); Mark Lewis, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 114 days.

(21) Appl. No.: 17/647,704

(22) Filed: Jan. 11, 2022

(65) Prior Publication Data

US 2022/0224168 A1    Jul. 14, 2022

Related U.S. Application Data

(60) Provisional application No. 63/136,159, filed on Jan. 11, 2021.

(51) Int. Cl.
*H02J 50/80*     (2016.01)
*H02J 50/40*     (2016.01)
(Continued)

(52) U.S. Cl.
CPC ............ *H02J 50/80* (2016.02); *H01Q 3/267* (2013.01); *H02J 50/20* (2016.02); *H02J 50/402* (2020.01); *H02J 50/90* (2016.02)

(58) Field of Classification Search
CPC .......... H02J 50/80; H02J 50/402; H02J 50/90; H02J 50/20
See application file for complete search history.

(56) References Cited

U.S. PATENT DOCUMENTS

| 4,468,624 A | 8/1984 | Rehbein et al. |
| 10,090,714 B2 | 10/2018 | Bohn et al. |

(Continued)

FOREIGN PATENT DOCUMENTS

| CN | 102239598 A | 11/2011 |
| CN | 105765821 A | 7/2016 |

(Continued)

OTHER PUBLICATIONS

International Search Report and Written Opinion for International Application No. PCT/US2022/012031, Search completed Mar. 21, 2022, dated Apr. 6, 2022, 27 Pgs.

(Continued)

*Primary Examiner* — Jared Fureman
*Assistant Examiner* — Esayas G Yeshaw
(74) *Attorney, Agent, or Firm* — KPPB LLP

(57) ABSTRACT

Disclosed herein is a wireless power delivery system including: a wireless power generation unit (GU) including: a GU antenna array; and a GU wireless communication circuit; and one or more recovery units (RUs), wherein each RU includes: an RU antenna array; and an RU wireless communication circuit. The GU antenna array is configured to use volumetric refocusing to scan the area for the one or more RUs by sweeping a wireless scan signal to be captured by the RU antenna array. The RU antenna array receives the wireless scan signal, the RU wireless communication unit is configured to transmit a wireless signal back to the GU wireless communication unit. The GU is configured to record the focal coordinates of each RU based upon the signal received by the GU from each RU. The GU is configured to emit a wireless power signal to the recorded focal coordinates of each RU.

22 Claims, 11 Drawing Sheets

(51) Int. Cl.
*H02J 50/90* (2016.01)
*H01Q 3/26* (2006.01)
*H02J 50/20* (2016.01)

(56) References Cited

U.S. PATENT DOCUMENTS

| | | | |
|---|---|---|---|
| 10,277,046 | B1 | 4/2019 | Colosimo et al. |
| 10,516,302 | B2 | 12/2019 | Lee et al. |
| 10,880,688 | B2 | 12/2020 | Hajimiri et al. |
| 11,201,505 | B2 * | 12/2021 | Mor ................. H02J 50/40 |
| 11,659,355 | B2 | 5/2023 | Hajimiri et al. |
| 2013/0099584 | A1 | 4/2013 | Von Novak, III |
| 2014/0009108 | A1 | 1/2014 | Leabman |
| 2015/0167785 | A1 | 6/2015 | Lee et al. |
| 2015/0326061 | A1 | 11/2015 | Davison et al. |
| 2016/0052405 | A1 | 2/2016 | Koizumi et al. |
| 2016/0094092 | A1 | 3/2016 | Davlantes et al. |
| 2016/0190872 | A1 | 6/2016 | Bohn et al. |
| 2016/0301465 | A1 | 10/2016 | Olesen et al. |
| 2017/0063103 | A1 | 3/2017 | Do et al. |
| 2017/0077735 | A1 | 3/2017 | Leabman |
| 2017/0077995 | A1 | 3/2017 | Leabman |
| 2017/0271925 | A1 | 9/2017 | Plekhanov et al. |
| 2017/0358950 | A1 | 12/2017 | Zeine et al. |
| 2019/0006888 | A1 | 1/2019 | Hajimiri et al. |
| 2019/0081514 | A1 | 3/2019 | Cha |
| 2019/0131827 | A1 | 5/2019 | Johnston et al. |
| 2019/0214855 | A1 | 7/2019 | Abiri et al. |
| 2020/0006988 | A1 * | 1/2020 | Leabman ................. H02J 50/60 |
| 2020/0076241 | A1 | 3/2020 | Tandai et al. |
| 2020/0144865 | A1 * | 5/2020 | Vilenskiy ................. H02J 50/27 |
| 2020/0196097 | A1 | 6/2020 | Hajimiri et al. |
| 2020/0204002 | A1 | 6/2020 | Hajimiri et al. |
| 2020/0230426 | A1 * | 7/2020 | Willis ................. A61N 1/3787 |
| 2020/0403457 | A1 * | 12/2020 | Nydell ............... H04B 10/1123 |
| 2021/0013747 | A1 * | 1/2021 | Wang ...................... H02J 50/80 |
| 2021/0076159 | A1 | 3/2021 | Hajimiri et al. |

FOREIGN PATENT DOCUMENTS

| | | |
|---|---|---|
| CN | 113366769 A | 9/2021 |
| CN | 113366769 B | 10/2022 |
| KR | 20210104778 A | 8/2021 |
| WO | 2020132139 A1 | 6/2020 |
| WO | 2020132139 A8 | 7/2021 |
| WO | 2022150780 A1 | 7/2022 |

OTHER PUBLICATIONS

International Preliminary Report on Patentability for International Application No. PCT/US2019/067281, Report dated Jun. 16, 2021, dated Jul. 1, 2021, 12 Pgs.
International Preliminary Report on Patentability for International Application No. PCT/US2022/012031, Report dated Jul. 4, 2023, dated Jul. 20, 2023, 19 Pgs.
International Search Report and Written Opinion for International Application No. PCT/US2019/067281, search completed on Feb. 12, 2020, dated Feb. 27, 2020, 18 Pgs.
Aumann et al., "Phased Array Antenna Calibration and Pattern Prediction Using Mutual Coupling Measurements", IEEE Transactions on Antenna and Propagation, vol. 37, No. 7, Jul. 1989, pp. 844-850.
Berra, "Analysis and Exploitation of Multiple Antennas Interaction in the Near-Field", Universita di Bologna, Dottorato Di Ricerca in Ingegneria Elettronica, Telecomunicazioni e Tecnologie Dell'Informazione, 2018, 111 pgs.
Costanzo et al., "Energizing 5G", IEEE Microwave Magazine, May 2017, pp. 125-136, published Apr. 7, 2017DOI: 10.1109/MMM.2017.2664001.
Groger et al., "Experimental Phased Array Radar Elra with Extended Flexibility", IEEE International Radar Conference, 1990, pp. 286-290.
Hedayat et al., "Hadamard Matrices and their Applications", Annals of Statistics, vol. 6, No. 6, 1978, pp. 1184-1238.
Liu et al., "A Near Field Focused Lens Antenna for Wireless Power Transmission Systems", 2018 IEEE Asia-Pacific Conference on Antennas and Propagation, Aug. 2018, pp. 313-315.
Mizojiri et al., "Wireless Power Transfer via Subterahertz-Wave", Applied Sciences, vol. 8, No. 12, Dec. 2018, 19 pgs.
Nariman, "Millimeter-Wave Wireless Power Transfer Systems for the Internet of Things", UC Irvine Electronic Theses and Dissertations, Retrieved from https://escholarship.org/uc/item/09b6c4b3, Published 2016, 110 pgs.
Nariman et al., "A Compact 60-GHz Wireless Power Transfer System", IEEE Transactions on Microwave Theory and Techniques, vol. 64, No. 8, Aug. 2016, pp. 2664-2677.
Nariman et al., "A Compact Millimeter-Wave Energy Transmission System for Wireless Applications", 2013 IEEE Radio Frequency Integrated Circuit Symposium, 2013, pp. 407-410.
Nariman et al., "A Switched-Capacitor mm-Wave VCO in 65 nm Digital CMOS", 2010 IEEE Radio Frequency Integrated Circuits Symposium, 2010, pp. 157-160.
Nariman et al., "High-Efficiency Millimeter-Wave Energy-Harvesting Systems With Milliwatt-Level Output Power", IEEE Transactions on Circuits and Systems II: Express Briefs, vol. 64, No. 6, Jun. 2017, pp. 605-609.
Ng et al., "Wireless Information and Power Transfer: Energy Efficiency Optimization in OFDMA Systems", IEEE Transactions on Wireless Communications, vol. 12, No. 12, Dec. 2013, pp. 6352-6370.
Patton et al., "Near-Field Alignment of Phased-Array Antennas", IEEE Transactions on Antennas and Propagation, vol. 47, No. 3, Mar. 1999, pp. 584-591.
Sander, "Monitoring and Calibration of Active Phased Arrays", IEEE International Radar Conference, 1985, pp. 45-51.
Yedavalli et al., "Far-Field RF Wireless Power Transfer with Blind Adaptive Beamforming for Internet of Things Devices", IEEE Access, vol. 5, Feb. 8, 2017, pp. 1743-1752.

* cited by examiner

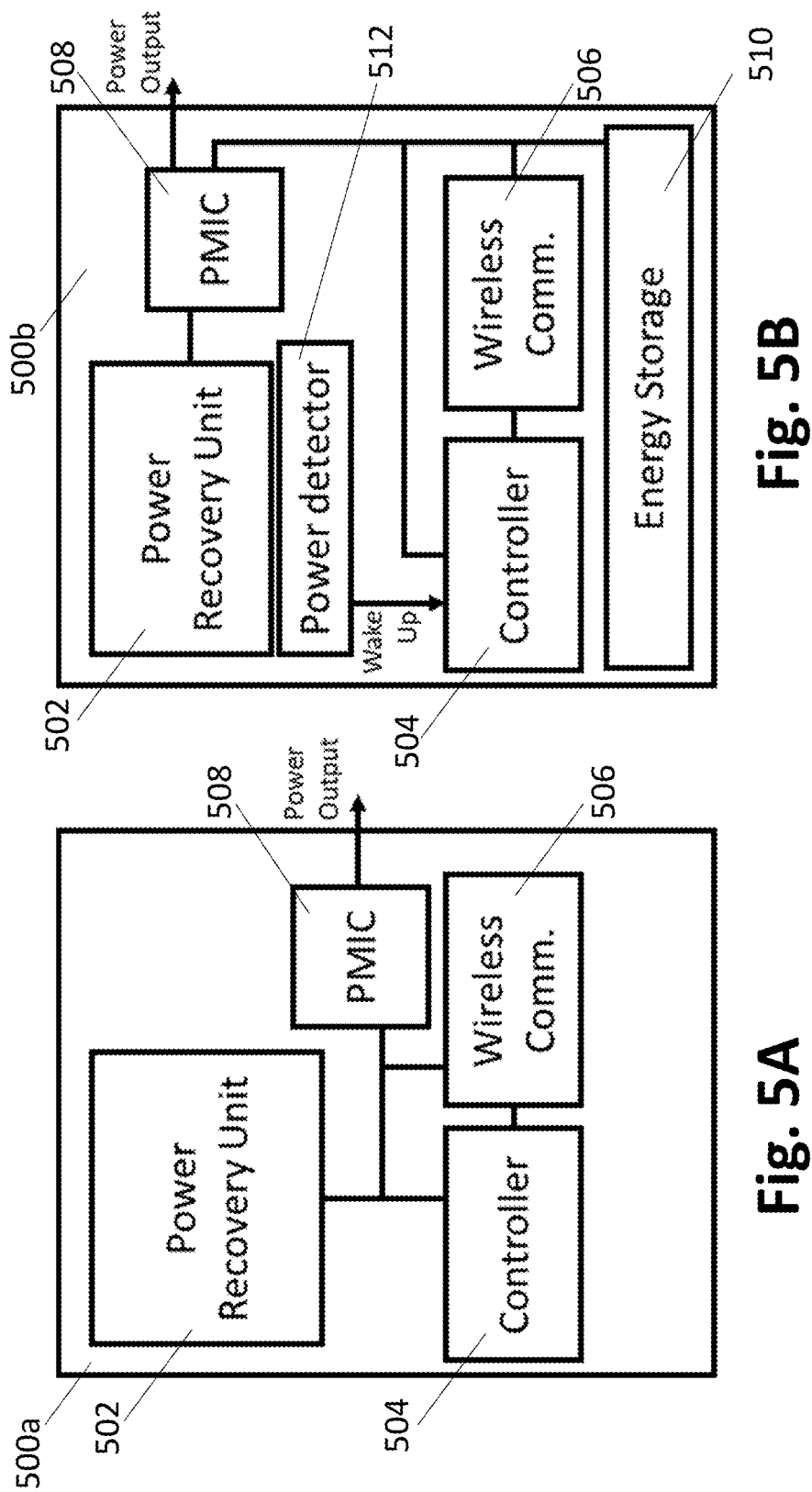

WIRELESS POWER DELIVERY SYSTEMS AND METHODS OF DELIVERING WIRELESS POWER

CROSS-REFERENCE TO RELATED APPLICATIONS

This application claims the benefit of and priority under 35 U.S.C. § 119(e) to U.S. Provisional Patent Application Ser. No. 63/136,159, entitled "Long Distance Wireless Power Delivery to a Battery Free Device" and filed Jan. 11, 2021, which is incorporated herein by reference in its entirety for all purposes.

FIELD OF THE INVENTION

The present invention generally relates to wireless power delivery systems and methods of delivering wireless power.

BACKGROUND

Non-proximity wireless power transmission at a distance through use of radio frequency (RF) and mm-wave beam forming and focusing may enable and enhance a plethora of new applications such as powering and charging of portable and standalone devices wirelessly. For example, the proliferation of internet of things (IoT) devices and sensors can be substantially accelerated by delivering power to them wirelessly and eliminating need for extra wiring during installation of such devices or frequent replacement or charging of batteries. Another example of practical usage of such devices is continuous background wireless powering and charging of portable personal devices, such as smartphones and tablets that may significantly enhance their usability and in the long run reduce the demand on the amount of energy that needs to be carried by such devices (e.g., as in a battery), due the ubiquity and availability of long-range wireless power transfer and wireless charging. In addition to these devices many other smaller devices such as wireless mouse and keyboard to thermostats and security sensors and cameras may benefit from wireless power transfer, which may eliminate the need to plug them in or change the battery.

SUMMARY OF THE INVENTION

Various embodiments are directed to a wireless power delivery system including: a wireless power generation unit (GU) including: a GU antenna array; and a GU wireless communication circuit; and one or more recovery units (RUs), where each RU comprises: an RU antenna array; and an RU wireless communication circuit, where the GU antenna array is configured to use volumetric refocusing to scan the area for the one or more RUs by sweeping a wireless scan signal to be captured by the RU antenna array, where when the RU antenna array receives the wireless scan signal, the RU wireless communication unit is configured to transmit a wireless signal back to the GU wireless communication unit, where the GU is configured to record the focal coordinates of each RU based upon the signal received by the GU from each RU, and where the GU is configured to emit a wireless power signal to the recorded focal coordinates of each RU to be received by each RU antenna array.

In various other embodiments, the GU records the focal coordinates of each RU further based upon when the wireless signal is received by the GU and the beam direction of the wireless scan signal at that time.

In still various other embodiments, the GU further includes: a processor; and memory including machine readable instructions executable by the processor to: control the GU antenna array to sweep the wireless scan signal; record the focal coordinates of each RU; and control the GU antenna array to emit the wireless power signal to the focal coordinates of each RU.

In still various other embodiments, at least one of the one or more RUs is a passive device configured to wake up when the wireless scan signal is received and transmit the wireless signal to the GU.

In still various other embodiments, at least one of the one or more RUs further includes an energy storage component capable of powering the RU wireless communication circuit and an RU controller.

In still various other embodiments, the RU controller is configured to control the RU wireless communication circuit to transmit the wireless signal back to the GU wireless communication unit.

In still various other embodiments, the at least one of the one or more RUs further includes a power detector which is configured to wake up the RU controller when the wireless scan signal is captured by the RU antenna array.

In still various other embodiments, the RU further includes a power management integrated circuit which is configured to deliver the power received from the wireless power signal to a powered device.

In still various other embodiments, the wireless power signal includes a start signal and a stop signal.

In still various other embodiments, the start signal includes transitioning from a high amplitude signal to a low amplitude signal.

In still various other embodiments, the stop signal includes transitioning to the low amplitude signal.

In still various other embodiments, the low amplitude signal is lower in amplitude than an intermediate ongoing switching.

In still various other embodiments, the intermediate ongoing switching includes beam switching or time-division multiplexing.

In still various other embodiments, volumetric refocusing includes dynamically moving the focal point of the GU antenna array by applying different phase settings to the wireless scan signal.

In still various other embodiments, volumetric refocusing further includes utilizing a phase table obtained by focusing into a known location and re-calculating the phase settings to refocus the wireless scan signal to a different point in space.

In still various other embodiments, the re-calculated phase settings include a phase adjustment of:

$$\Delta \psi_{mn} \cong \frac{2\pi}{\lambda} \Delta L_{mn}(\vec{R}_0 \vec{R}_1),$$

where antenna m, n in the GU antenna array is used to refocus the wireless scan signal to location $\vec{R}_1$ from a calibration point $\vec{R}_0$, and $\Delta L_{mn}(\vec{R}_0 \vec{R}_1)$ is the length difference of antenna m, n in the array to the calibration point $\vec{R}_0$ and the location $\vec{R}_1$.

Various embodiments are further directed to a method for delivery wireless power, the method including: scanning, using volumetric refocusing, a wireless scan signal from a wireless power generation unit (GU) to one or more recovery units (RUs); when the RUs receive the wireless scan signal, each of the RUs is configured to transmit a wireless signal back to the GU; recording the focal coordinates of each RU based upon the signal received by the GU from each RU; and emitting a wireless power signal from the GU to the recorded focal coordinates to be received by each RU.

In various other embodiments, at least one of the one or more RUs is a passive device configured to wake up when receiving the wireless scan signal and transmit the wireless signal to the GU.

In still various other embodiments, at least one of the one or more RUs includes an energy storage component and a power detector which is configured to detect the wireless scan signal and wake up the RU to transmit the wireless signal to the GU.

In still various other embodiments, the wireless power signal includes a start signal and a stop signal.

In still various other embodiments, the start signal includes transitioning from a high amplitude signal to a low amplitude signal.

In still various other embodiments, the stop signal includes transitioning to the low amplitude signal.

In still various other embodiments, the low amplitude signal is lower in amplitude than an intermediate ongoing switching.

In still various other embodiments, the intermediate ongoing switching includes beam switching or time-division multiplexing.

In still various other embodiments, volumetric refocusing includes dynamically moving the focal point of the GU antenna array by applying different phase settings to the wireless scan signal.

Various embodiments are further directed to a wireless power generation unit (GU) including: a GU antenna array; a GU wireless communication circuit; and a computing unit, where the GU antenna array is configured to use volumetric refocusing to scan the area for one or more recovery units (RUs) by sweeping a wireless scan signal to be captured by each of the RUs, where the GU wireless communication circuit is configured to receive a signal transmitted back from each of the RUs after the RU receives the wireless scan signal, where the computing unit is configured to record the focal coordinates of each RU based upon the signal received from each RU, and where the GU antenna array is further configured to emit a wireless power signal to the recorded focal coordinates of each RU to be received by each RU.

In various other embodiments, the wireless power GU further includes a hardware controller configured to control the GU antenna array.

In still various other embodiments, the wireless power signal comprises a start signal and a stop signal.

In still various other embodiments, the start signal includes transitioning from a high amplitude signal to a low amplitude signal.

In still various other embodiments, the stop signal comprises transitioning to the low amplitude signal.

In still various other embodiments, the low amplitude signal is lower in amplitude than an intermediate ongoing switching.

In still various other embodiments, the intermediate ongoing switching includes beam switching or time-division multiplexing.

In still various other embodiments, volumetric refocusing includes dynamically moving the focal point of the GU antenna array by applying different phase settings to the wireless scan signal.

In still various other embodiments, volumetric refocusing further includes utilizing a phase table obtained by focusing into a known location and re-calculating the phase settings to refocus the wireless scan signal to a different point in space.

In still various other embodiments, the re-calculated phase settings include a phase adjustment of:

$$\Delta\psi_{mn} \cong \frac{2\pi}{\lambda}\Delta L_{mn}(\vec{R}_0\vec{R}_1),$$

where antenna m, n in the GU antenna array is used to refocus the wireless scan signal to location $\vec{R}_1$ from a calibration point $\vec{R}_0$, and $\Delta L_{mn}(\vec{R}_0\vec{R}_1)$ is the length difference of antenna m, n in the array to the calibration point $\vec{R}_0$ and the location $\vec{R}_1$.

Various embodiments are further directed to a recovery unit (RU) including: an RU antenna array; an RU wireless communication circuit; and a controller, where the RU antenna array is configured to: receive a wireless scan signal from a wireless power generation unit (GU); after the RU antenna array receives the wireless scan signal, wake up the controller which turns on the RU wireless communication circuit to broadcast a signal back to the GU; and receive a wireless power signal from the GU.

In various other embodiments, the RU is a passive device configured to wake up when receiving the wireless scan signal and broadcast the wireless signal back to the GU.

In still various other embodiments, the RU further includes an energy storage component which powers the RU wireless communication circuit and an RU controller.

In still various other embodiments, the RU controller is configured to control the RU wireless communication circuit to transmit the wireless signal back to the GU.

In still various other embodiments, the RU further includes a power detector which is configured to wake up the RU controller when the wireless scan signal is captured by the RU antenna array.

In still various other embodiments, the RU further includes a power management integrated circuit which is configured to deliver the power received from the wireless power signal to a powered device.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 5A illustrates a schematic of fully passive RU in accordance with an embodiment of the invention.

FIG. 5B illustrates a schematic of a RU with at least some energy storage in accordance with an embodiment of the invention.

DETAILED DESCRIPTION

Turning now to the drawings, wireless power generation units (GU) in accordance with various embodiments of the invention are illustrated. In a number of embodiments, the GUs include multiple synchronized RF sources and antennas, in addition to various other capabilities such as processing capability, hardware interface, and communication capabilities, among other things. In several embodiments, the GU delivers power to one or more recovery unit(s) (RUs). In many embodiments, the phase and amplitude of each source may be adjustable to allow constructive interference in a specific location or multiple locations in space where the RUs may be present. The RUs may have, among other capabilities, additional measurement, processing and communication capabilities with the GU, in addition to power recovery array. For example, the RU(s) can include power recovery devices, such as rectennas to collect the RF energy from the GU and convert the RF energy to power (e.g. DC power). The power may be used to power a device to which the RU is connected.

Figure 1:
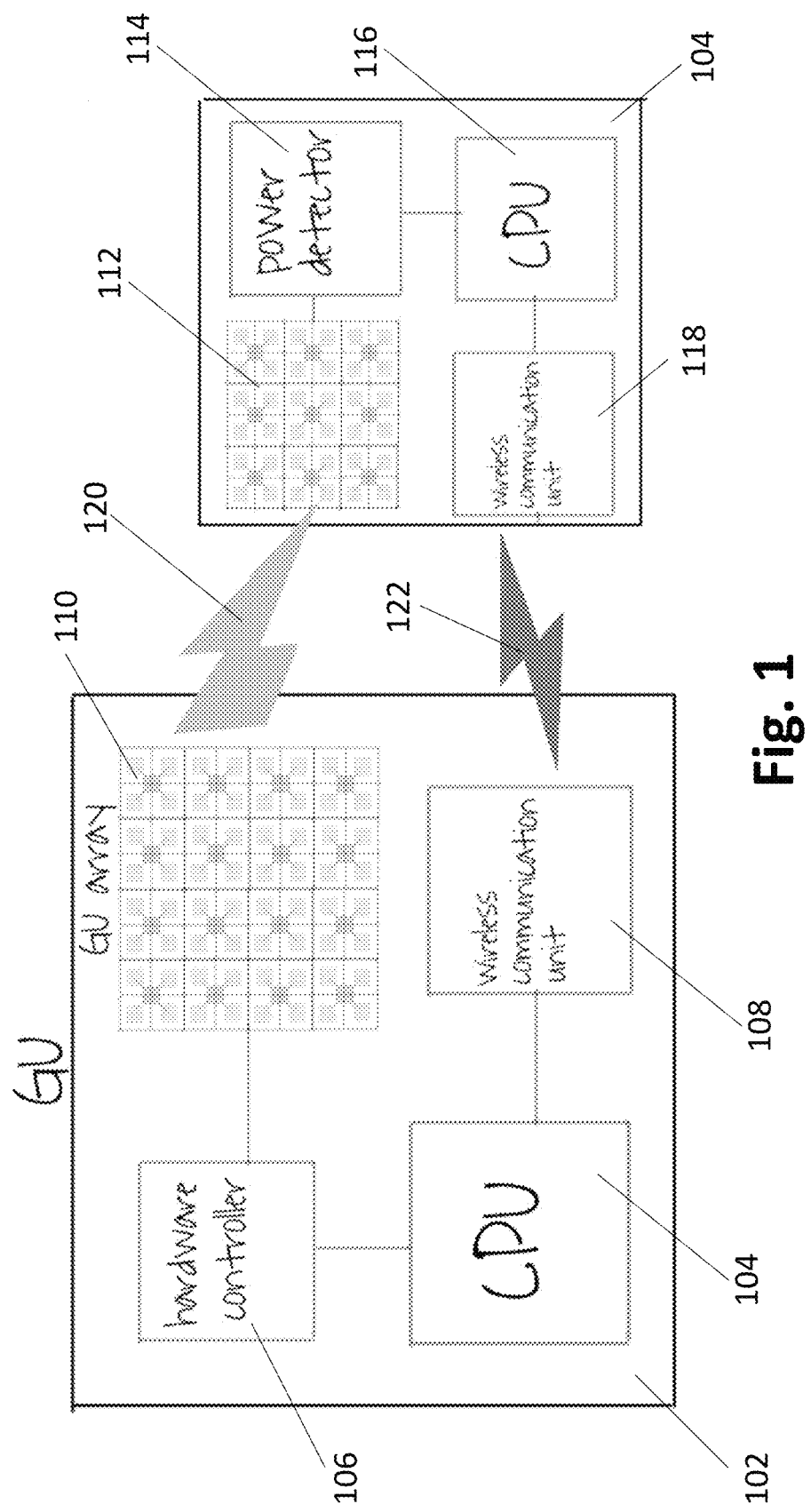
FIG. 1 shows an exemplary wireless power system in accordance with an embodiment of the invention.

FIG. 1 shows an exemplary wireless power system in accordance with an embodiment of the invention. The wireless power system 100 may include a GU 102 performing wireless power transfer to a RU 104. The GU may include a hardware controller 106 which may be linked to a central processing unit (CPU) 104. The CPU 104 may also communicate with a wireless communication unit 108. The hardware controller 106 is connected to a GU array 110 configured to transfer power 120 to the RU 104. The RU 104 includes an RU array 112 which is configured to receive the power 120 from the GU array 110. The GU array 110 may be connected to a power detector 114. The power detector 114 may send information to the CPU 116 which may be connected to a wireless communication unit 118. The wireless communication unit 118 of the RU array 112 may send and/or receive wireless communications 122 to/from the wireless communication unit 108 of the GU 102. While only one RU is illustrated, it is understood that multiple RUs may be present which each may be fed power to the GU 102.

To facilitate efficient power transmission, the GU 102 may transmit and transfer power in different directions and orientations. The GU 102 may be able to change the direction and orientation rapidly and effectively, with as low of power spill over (e.g. power not recovered and thus wasted) as possible. There may exist a combination of phases of the GU array 110 on the GU 102 configured to provide RF power 120 that maximizes the energy concentration transferred to the RU array 112 for a given RU 104 location and orientation.

Figure 2A:
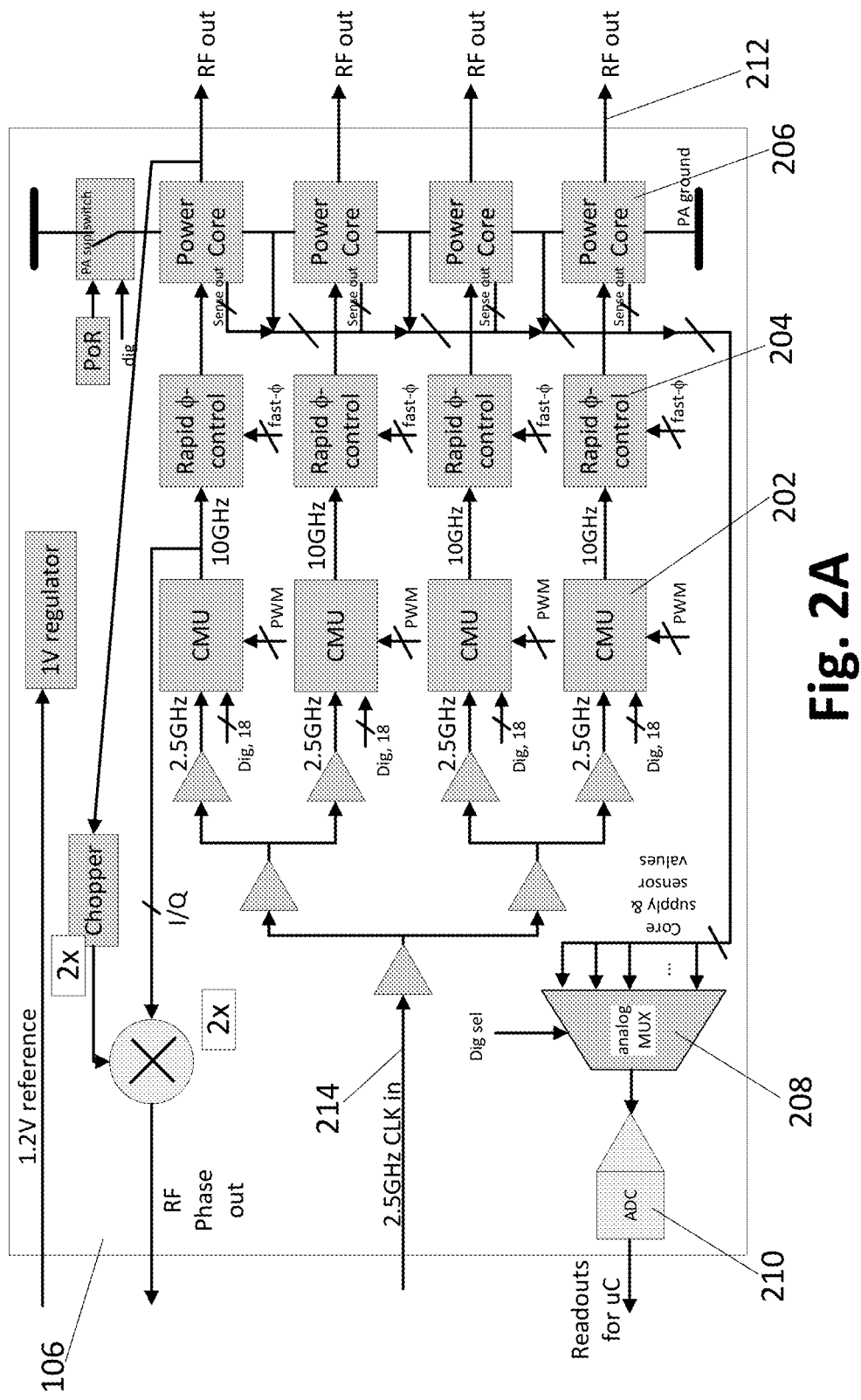
FIG. 2A illustrates an example hardware controller within a generation unit (GU) in accordance with an embodiment of the invention.

The hardware controller 106 can be utilized within the GU 102 to generate multiple RF outputs with independently controlled phases from a single reference signal in accordance with an embodiment of the invention is illustrated in FIG. 2A. The hardware controller 106 can independently control the phase setting of each one of the elements using different phase control mechanisms, such as (but not limited to) a phased-locked loop (PLL) with an additional phase controller. Such a PLL could also perform clock multiplication and can be referred to as a clock multiplier unit (CMU) 202. In the case where a CMU 202 is used for phase shifting, each CMU can control the phase of one transmission element independently via digital steps. Each CMU receives a reference clock signal as an input and applies a phase shift to a multiplied version of the reference clock signal (e.g. a signal having a frequency that is a multiple of the reference signal). In the illustrated embodiment, the CMUs 202 receive a 2.5 GHz CLK_in signal and output a phase shifted 10 GHz signal. Additional phase control can be applied using a rapid phase control circuit 204. The rapid phase control circuit 204 can be used to modulate a data signal onto the transmitted wireless power signal. In a number of embodiments, a modulation scheme such as (but not limited to) a Phase Shift Keying or Quadrature Phase Shift Keying modulation scheme can be utilized. In several embodiments, a rapid amplitude control circuit can also be provided that can allow the use of more complex modulation schemes including (but not limited to) Quadrature Amplitude Modulation. Separate power amplifiers 206 then output RF signals to each of the elements in the antenna array.

In the illustrated embodiment, the hardware controller 106 includes additional hardware enabling measurement of the output power of the power amplifiers. In several embodiments, a multiplexer 208 enables an analog to digital converter 210 to measure a sensor output signal from each of the power amplifiers. The digitized output can be provided to the processing system of the GU to enable monitoring of output power delivered by the individual elements of the antenna array.

In addition to changing the phases of the individual elements, the control mechanism may also change the amplitudes of the individual elements, either independently or together with the phase settings. Changing the amplitude of the GU elements may allow further improvement in the overall energy available to the RU for recovery and further minimization of the power spill over. The methods and procedures discussed herein are, in general, applicable to controlling both phase and amplitude even when discussed primarily in one context or the other.

The hardware controller 106 may include multiple outputs 212 and can generate independently controlled phases and amplitudes from a single reference signal 214. The hardware controller 106 may include control elements each connected to one of the multiple outputs 212. The phase and amplitude of different control elements can be controlled independently. The phase setting of each one of the control elements can be independently controlled by different phase control mechanisms, such as (but not limited to) the phased-locked loop (PLL) with additional phase controller. Such a PLL could also perform clock multiplication and may be a clock multiplier unit (CMU) 202 on the hardware controller 106. In the case where a CMU 202 is used for phase shifting, each CMU 202 may control the phase of one transmission element independently via digital steps.

There may be several methods to find the proper phase/ amplitude for each output 212 including a transmit element to achieve maximum power delivery to the RU 104. Various embodiments utilize control and wireless communication 122 in the RU 104 to provide power delivery feedback information to the GU 102. Such control and communication circuitry may include some initial power that is assumed to be available to the RU 104 via an energy storage such as battery, super capacitors, etc. to initialize the communication. It may be advantageous to have a focusing mechanism capable of delivering power to a passive RU 104, an RU 104 in which the energy storage is fully depleted, or in cases where the RU 104 does not contain an energy storage unit.

Figure 2B:
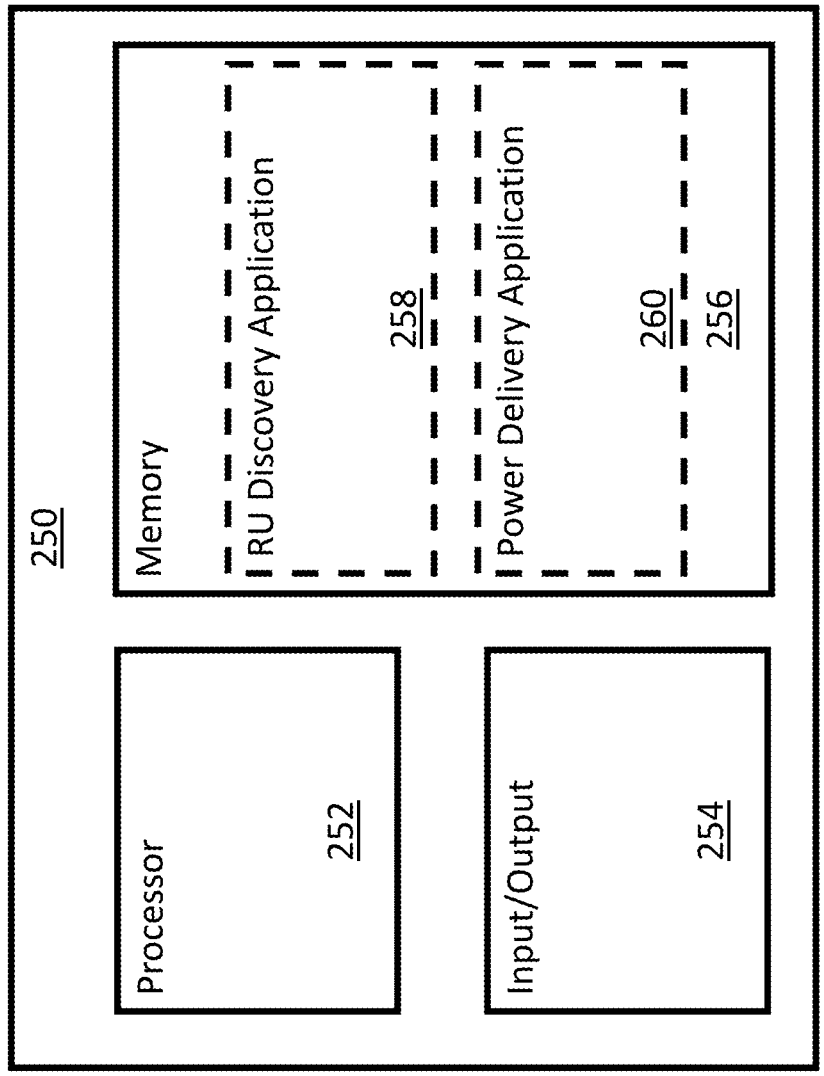
FIG. 2B illustrates a block diagram of an example computing system of the GU in accordance with an embodiment of the invention.

FIG. 2B illustrates a block diagram of an example computing system 104 of the GU 102 in accordance with an embodiment of the invention. The computing system 104 includes a processor 252 for controlling the operations of an input/output interface 254, which is capable of receiving and transmitting data, such as information from the wireless communication unit 108 and/or the hardware controller 106, and memory 256. The memory 256 includes programming including an RU discovery application 258 and a power delivery application 260 which is executable by the processor 252. The term "application" herein is utilized to describe machine readable instructions including (but not limited to) software applications, operating system software, firmware, embedded firmware, and/or instructions utilized to configure an FPGA, etc.

The processor 252 may execute the RU discovery application 258 to operate the input/output 304 which may send instructions to the hardware controller 106 to operate the GU array 110 to send a wireless scan signal to be captured by the RU antenna array 112 of the RU 104. The GU array 110 may receive a wireless signal back from the RU antenna array 112 of the RU 104. The RU discovery application 258 may record the focal coordinates of each RU 104 based upon the signal received by the GU 102 from each RU 104. In some embodiments, the RU discovery application 258 records the focal coordinates of each RU 104 based upon when the wireless signal is received by the GU 102 and the beam direction of the wireless scan signal at that time.

Once the RU discovery application 258 completes the wireless scan to discover the position of all the RUs 104, the processor 252 may execute the power delivery application 260 to operate the input/output 304 which may send instructions to the hardware controller 106 to operate the GU array 110 to send a wireless power signal to each of the RUs 104. The power delivery application 260 may operate the GU array 110 to send the wireless power signal to the recorded focal coordinates of each RU 104 to be received by each RU antenna array 112 of the RUs 104.

Various embodiments include dynamic volumetric refocusing of RF arrays which allows for dynamic movement of the focal point of the RF lens to any coordinates by calculating and applying the phase differences to the phase settings of a known reference focal point. This method of refocusing may be fully contained in the GU 102. In some embodiments, the GU 102 can be used in a wireless power transfer system to avoid new refocusing. In some embodiments, the GU 102 may use this newly evaluated value as the initial condition for the focusing. In some embodiments, the GU 102 can significantly enhance the quality and duration of the optimization process. This approach may provide rapid predictive tracking of the RU units 104, leading to enhance performance in various applications, such as wireless power transfer, sensing, and communications.

Figure 3:
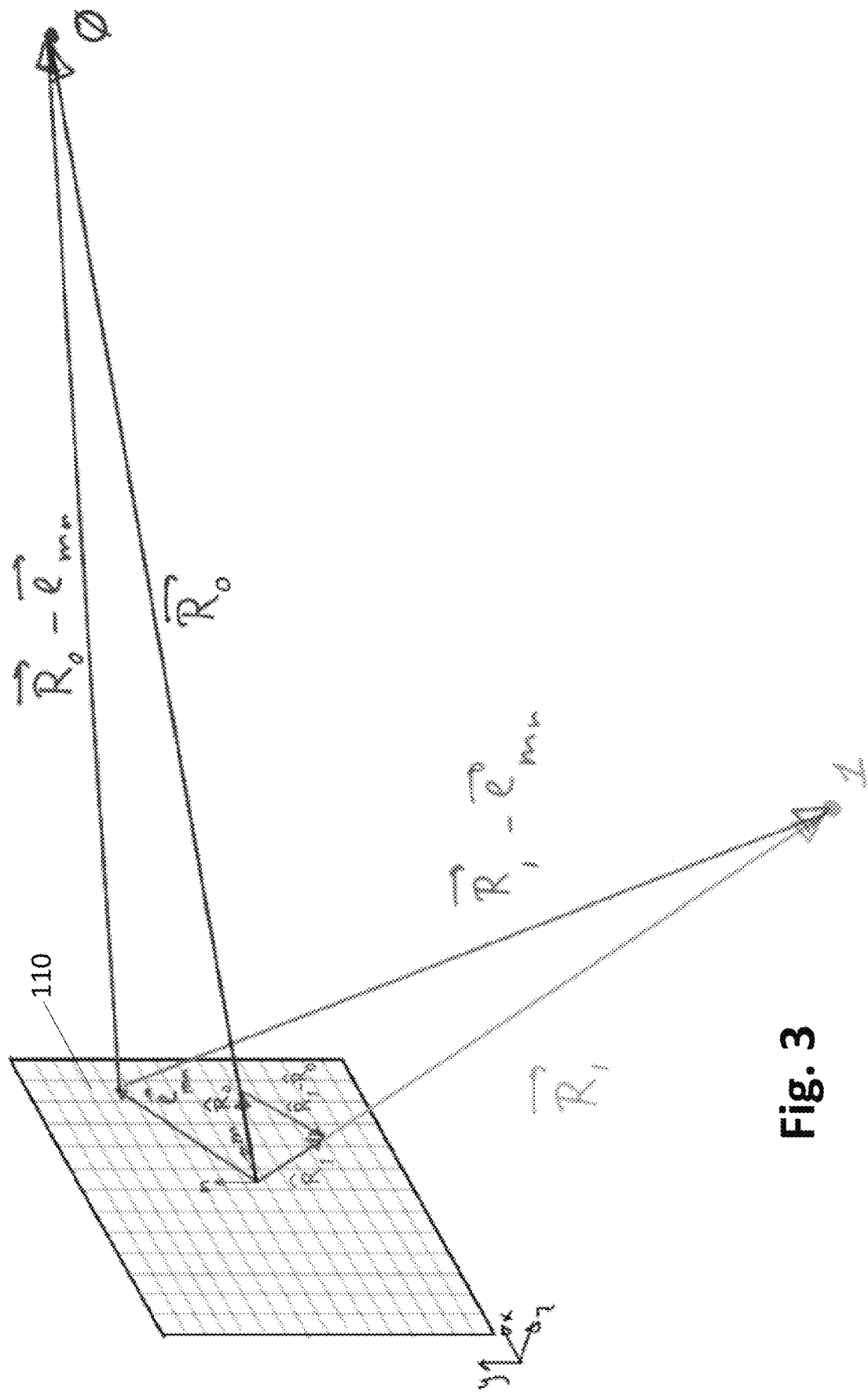
FIG. 3 illustrates an example of dynamic volumetric refocusing of RF lensing in accordance with an embodiment of the invention.

Volumetric refocusing may allow sending power to different locations very rapidly. FIG. 3 illustrates an example of dynamic volumetric refocusing of RF lensing in accordance with an embodiment of the invention. The GU array 110 of the GU 102 may utilize dynamic volumetric refocusing to scan a power delivery to multiple locations. Dynamic volumetric refocusing may only include the coordinates of focal point. This ability can be used to launch a series of 3D volumetric scans of RF focal point within the field of view of the GU array 110. This technique can utilize a phase table obtained by focusing into a known location (e.g. a calibration point) and re-calculating the phase settings to refocus the energy to a different point in space. The phase adjustment, $\Delta\psi_{mn}$, for antenna m, n in the array to refocus the beam to location $\vec{R}_1$ from a calibration point $\vec{R}_0$ is given by:

$$\Delta\psi_{mn} \cong \frac{2\pi}{\lambda} \Delta L_{mn}(\vec{R}_0 \vec{R}_1)$$

Where $\Delta L_{mn}(\vec{R}_0 \vec{R}_1)$ is the length different of antenna m, n in the array to the points 0 and 1:

$$\Delta L_{mn}(\vec{R}_0 \vec{R}_1) = \left[ |\vec{R}_0|^2 - 2\vec{R}_0 \cdot \vec{e}_{mn} + |\vec{e}_{mn}|^2 \right]^{1/2} - \left[ |\vec{R}_1|^2 - 2\vec{R}_1 \cdot \vec{e}_{mn} + |\vec{e}_{mn}|^2 \right]^{\frac{1}{2}} + |\vec{R}_1| - |\vec{R}_0|$$

An example of dynamic volumetric refocusing are disclosed in U.S. Pat. Pub. No. 2020/0196097, entitled "Dynamic Focusing and Tracking for Wireless Power Transfer Arrays" and filed Dec. 18, 2019, the disclosure of which including the disclosure related to dynamic volumetric refocusing is hereby incorporated by reference in its entirety for all purposes.

In some embodiments, the RU 104 may be a passive RU which can utilize the energy received from such scans to power up its internal circuitry and communicate back with the GU 102. An example of a passive RU device is described in connection with FIG. 5A below. In some embodiments, the RU 104 may at least include some energy storage as described in connection with FIG. 5B. In these instances, the RU 104 may include a power detector which may wake up a wireless communication unit.

In some embodiments, the communication can use any wireless method such as RF, Infrared, light, acoustics, etc. at a frequency substantially different than the power delivery frequency. The use of a different frequency may ensure that the RF wave used for power delivery does not act as a blocker for the communication, hence, a more sensitive receiver can be implemented on the GU 102, reducing the power requirements of data transmitter circuitry on the RU 104.

In some embodiments, the GU 102 may include an inertial and magnetometer unit (IMU). The IMU may be a sensor that measures acceleration, rotation and earth magnetic field to identify the orientation and movement of a device. The data sent from the RU 104 to the GU 102 may include any combination of (but is not limited to) device ID, received power, orientation, and motion information from the IMU, information from other sensors, power increase/decrease requests, authentication, priority, etc.

In some embodiments, the GU 102 may record the received data along with coordinates of focal point from which it receives the communication. Upon completion of scan, the GU may process the recorded data to judge the number of unique RUs in the field of view, the focal coordinates that provides the maximum power to each RU, amount of power to provide to each RU, etc. Then the GU 102 may provide power to the RU(s) 104 by loading the focal coordinate(s) that the RU(s) received power.

Figure 4A:
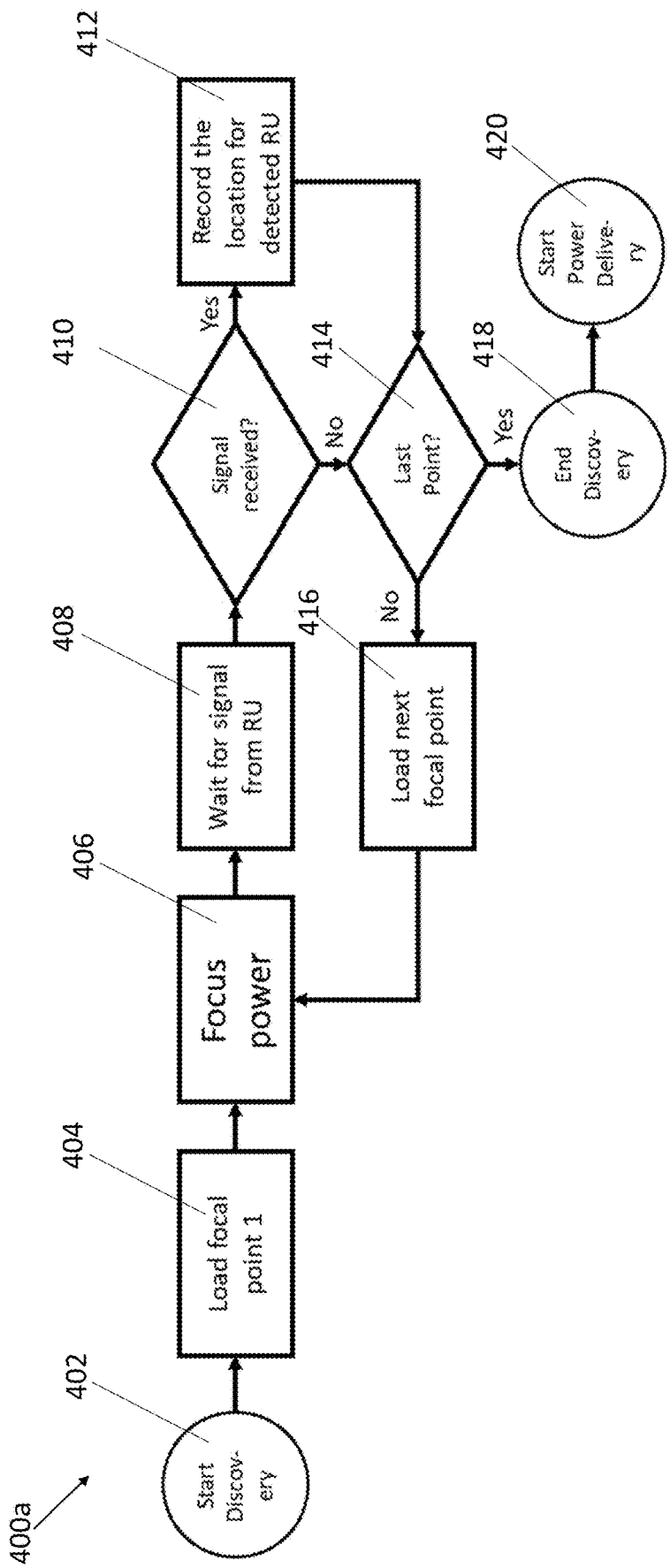
FIGS. 4A and 4B illustrate flowcharts of various recovery unit (RU) discovery processes to be performed by the GU in accordance with embodiments of the invention.
Figure 4B:
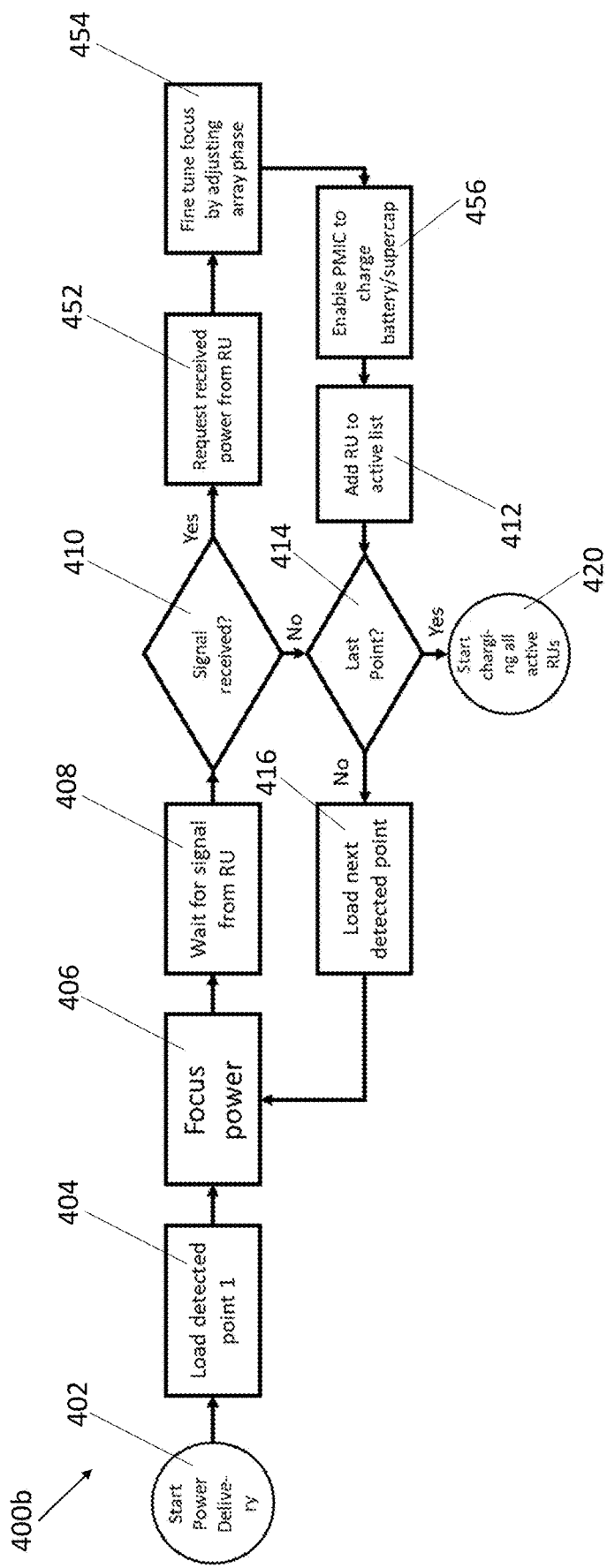

FIGS. 4A and 4B illustrate flowcharts of various RU discovery processes to be performed by the GU 102 in accordance with various embodiments of the invention. The RU discovery process may be performed utilizing the RU discovery application 258 described in connection with FIG. 2B. The term "application" herein is utilized to describe machine readable instructions including (but not limited to) software applications, operating system software, firmware, embedded firmware, and/or instructions utilized to configure an FPGA, etc. In FIG. 4A, the RU discovery process 400a begins by starting (402) RU discovery by loading 404 a first focal point. The RU discovery process 400a then focuses (406) a wireless scan signal on the first focal point. The RU discovery process 400a then waits (408) for a signal from an RU 104. If the signal is received (410) then the RU discovery process 400a records (412) the location of the detected RU. If this focal point was the last point (414) then the RU discovery process 400a ends (418) discovery and starts (420) power delivery.

Power delivery may be performed using the power delivery application 260 described in connection with FIG. 2B. The power delivery may include emitting a wireless power signal to the recorded focal coordinates of each RU to be received by each RU antenna array.

If the focal point was not the last point (414) then the RU discovery process 400a loads 416 a next scan point and iteratively focuses 406 power on each scan point until the RU discovery process determines (414) that the last point has been scanned.

FIG. 4B illustrates a RU discovery process 400b similar to the RU discovery process 400a described in connection with FIG. 4A with some additional steps. Many of the steps are identically labeled in FIG. 4A and their description will not repeated in detail. In FIG. 4B, when the GU 102 determines (410) that a signal has been received, the GU 102 sends (452) a request for received power from the RU 104. The received power from the RU 104 may be used to fine tune (454) the focus by adjusting the array phase of the signal from the GU 102. After fine tuning the focus, the wireless power signal may be used to power (456) a device connected to the RU 104. For example, the RU 104 may include a power management integrated circuit (PMIC) which may be used to power a battery and/or supercapacitor through the wireless power signal. The RU 104 may be added (412) to the active list of RUs. At the end of the RU discovery process 400b, the GU 102 may start charging (420) all active RUs based on the coordinates of all discovered RUs 104.

In some embodiments, multiple RUs can be simultaneously powered by rapidly switching the focal points or splitting the RF beam into multiple simultaneous beams. For time division-based power delivery to multiple RUs, the dwell time on each coordinate may be adjusted based on the power requirement of each RU. The switching time can be fast enough such that the local temporary energy storage device on the RU can maintain continuous operation between the beam switching.

The location of RU(s) may also be detected and recorded by GU. This information can be used by the GU to focus power initially to previously known locations of RU to speed up power delivery. In some embodiments, the change in location of RU can be used to trigger an action such as setting off an alert. The alert may notify the GU to rescan the location of the RU to continue power delivery.

In some embodiments, the GU may choose the focal point corresponding to an RU that provides the maximum power. In some embodiments, during RU discovery, the GU may choose various patterns and orders for going through various focal points, for instance, interleaving multiple points or rows to form different orders of sweeps. In some embodiments, the GU may perform a fine resolution scan around the coordinate that provided the maximum power to further improve the power delivery to that specific RU. In some embodiments, after powering up the RU controller/communication circuitry, the GU may perform phase optimization to further improve the focus and power delivery to the RU.

FIG. 5A illustrates a schematic of fully passive RU 500a in accordance with an embodiment of the invention. The fully passive RU 500a includes a power recovery unit 502, a controller 504, and a wireless communication circuitry 506. The fully passive RU 500A includes a power management integrated circuit (PMIC) 508 which conditions output power from the power recovery unit 502 to a powered device. The PMIC 508 may be an interface between the power recovery unit 502 and the powered device. The voltage/current from the RU 500a/500b may vary based on the available power. The PMIC 508 may insure that the voltage is regulated at output and the RU 500a/500b is operating at an optimum recovery point.

In some embodiments, the GU 102 may scan the environment with a wireless scan signal which provides enough power to activate a passive RU 500a. The passive RU 500a may receive a wireless power signal through the power recovery unit 502 which may power a wireless communication unit 506 and a controller 504. When the power recovery unit 502 receives power, the wireless communication unit 506 may send a wireless communication signal back to the GU 102. When the GU 102 receives the wireless communication signal (e.g. in the manner described above), the GU 102 may record the coordinates of the RU 500a. As discussed in connection with FIG. 4B, the wireless communication unit 506 may also transmit the received power from the RU 500a which may be used to fine tune the coordinates of the RU 500a.

FIG. 5B illustrates a schematic of a RU 500b with at least some energy storage in accordance with an embodiment of the invention. The RU 500b includes all the components of the fully passive RU 500a which are identically labeled. The description of these components in FIG. 5A are applicable to FIG. 5B and will not be repeated in detail. The RU 500b also contains an energy storage component 510 for powering up controller 504 and/or the wireless communication unit 506, but the RU 500b stays in a deep sleep mode until the GU volumetric scanning impinges on the RU 500b and a power detector 512 detects power from the power recovery unit 502 and wakes up the RU 500b. In some embodiments the power detector 512 may be part of the power recovery unit 502 itself. The energy storage component 510 allows the GU 102 to use much lower power during the scan and minimize RF exposure.

In some embodiments, the PMIC 508 incorporates an energy harvester that harvests ambient energy including the energy from GU volumetric scans to build up or maintain energy inside the energy storage component 510.

In some embodiments, the RU 500a, 500b may periodically transmit a signal to the GU 102 indicating that it is receiving power. This communication may be used by the GU 102 as a safety interlock to detect the blockage of RF path from GU 102 to RU 500a, 500b. The GU 102 may stop transmitting power or adjust its power level to the RU 500a, 500b if the power received by RU 500a, 500b suddenly drops or if reception of such transmissions is stopped. For example, when the controller 504 or wireless communication circuit 506 does not receive enough power to transmit received power to the PMIC, the transmission from the GU 102 may stop. This may be useful in many scenarios, such as those when an object absorbs enough power in the path between the GU 102 and the RU 500a, 500b so that the PMIC does not receive enough transmitted power to be able to harvest sufficient energy to power the powered device.

In some embodiments, the wireless communication circuitry 506 in the RU 500a, 500b and/or the wireless communication circuitry 108 in the GU 102 may support multiple frequency channels or frequency bands. In some embodiments, the GU 102 may identify the quietest frequency channel/band and transmit information in that frequency channel/band to RU 500a, 500b. The RU 500a, 500b may use the quietest frequency channel/band with minimal sufficient transmit power to send data back to GU 102 to minimize the communication power consumption and maximize range.

In some embodiments, the GU 102 transmits data to RU 500a, 500b via RF beam used for powering the RU 500a, 500b. Providing a higher power received by the RU 500a, 500b may eliminate the need for a power-hungry front-end low noise amplifier in the RU 500a, 500b.

In some embodiments, the wireless scan signal sent by the GU 102 may include a packet of data that sits on top of the RF beam that encodes information identifying which beam is being sent. The RU 500a, 500b may sent the information back to the GU 102. Thus, the GU 102 may be able to identify which scan is being sent back from the RU 500a, 500b.

Continuous transmission of status from the RU 500a, 500b to GU 102 may consume considerable power. Transmitting less status updates may increase the power available to deliver to the output by the PMIC 508. In some embodiments, the RU 500a, 500b can utilize a doppler sensing or field perturbance detection system which may detect fluctuations in the received power due to motion of a person or an object outside of the RF beam. In these embodiments, the RU 500a, 500b may not continuously transmit its status, but only does so when field perturbance is detected. This may lead to increased power delivery to the output while still enabling a robust safety mechanisms.

In some embodiments, the RU 500a, 500b may inform the GU 102 upon detection of such a fluctuation, perform status transmission periodically until the motion is not sensed, and then inform the GU 102 of the end of status transmissions. The GU 102 in this case may only stop the wireless power transmission if the reception of the status is stopped during the motion detection on the RU 500a, 500b.

Figure 5C:
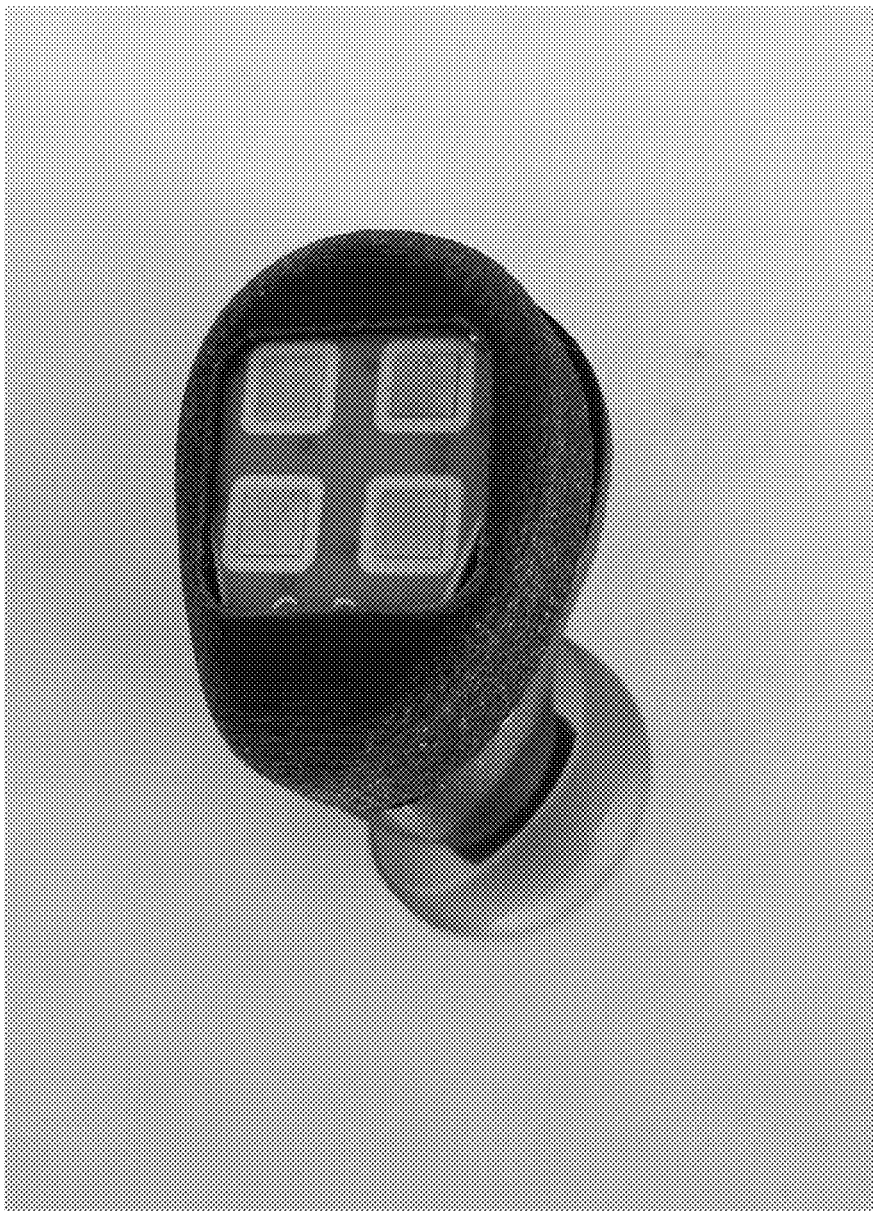
FIG. 5C illustrates an exemplary embodiment of an earbud with an integrated passive RU in accordance with an embodiment of the invention.

In some embodiments, the RU may be integrated into a wearable device to power the wearable device. The wearable device may include (but are not limited to) earbuds, headphones, active glasses, virtual reality (VR) and augmented reality (AR) devices, watches, health monitors, etc. and can incorporate the passive battery free unit. FIG. 5C illustrates an exemplary embodiment of an earbud with an integrated passive RU in accordance with an embodiment of the invention.

Figure 6:
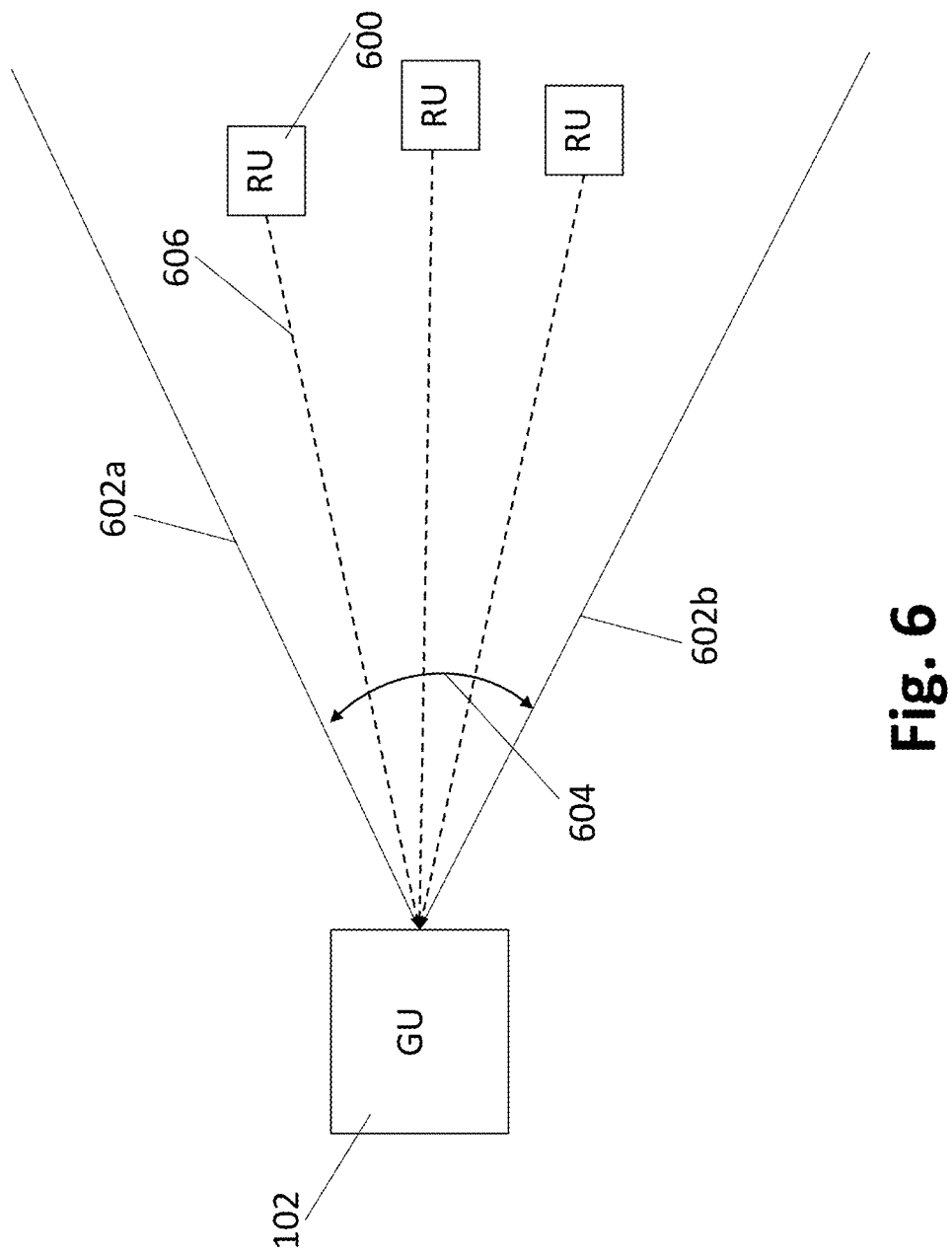
FIG. 6 schematically illustrates an RU discovery process in accordance with an embodiment of the invention.

FIG. 6 schematically illustrates an RU discovery process in accordance with an embodiment of the invention. A GU 102 transits a wireless scan signal. The wireless scan signal may be swept 604 between various signal boundaries 602a, 602b. The wireless scan signal may be swept 604 using dynamic volumetric refocusing as discussed above. When each of the one or more RUs 600 receive the wireless scan signal, each of the RUs 600 can send a wireless signal 606 back to the GU 102. The GU 102 can be configured to record the focal coordinates of each RU 600 based upon when the wireless signal is received by the GU 102 and the beam direction of the wireless scan signal at that time. The RUs 600 may be fully passive RUs 600a described in connection with FIG. 5A and/or the RUs 600b described in connection with FIG. 5B.

After the GU 102 completes the RU discovery process, the GU 102 can use the recorded focal coordinates of each RU 600 to emit a wireless power signal to each RU 600. In several embodiments, the amount of wireless power transmitted to each RU 600 can depend upon the characteristics of an RU and/or information maintained concerning or received from the RU.

In some embodiments, the GU 102 may encode a beam ID in the RF power beam used to power the RU 500a, 500b. As the GU 102 performs the RF beam scans, it may also transmit the beam ID along with the energy required to power up the RU controller 504 and/or the wireless communication circuitry 506. The RU 500a, 500b may record the power levels that it receives with each beam ID associated with it as the GU 102 beam scans over the RU 500a, 500b. The RU 500a, 500b may then communicate to the GU 102 the beam ID that provided the maximum power, where the GU 102 uses the information to send power directly to the GU 102. In some embodiments, the GU 102 sets the beam to the associated beam ID to power the RU 500a, 500b. In some embodiments, the GU 102 may run several iterations of finer resolution scans to better target the RU 500a, 500b and provide more power to the RU 500a, 500b.

Figure 7:
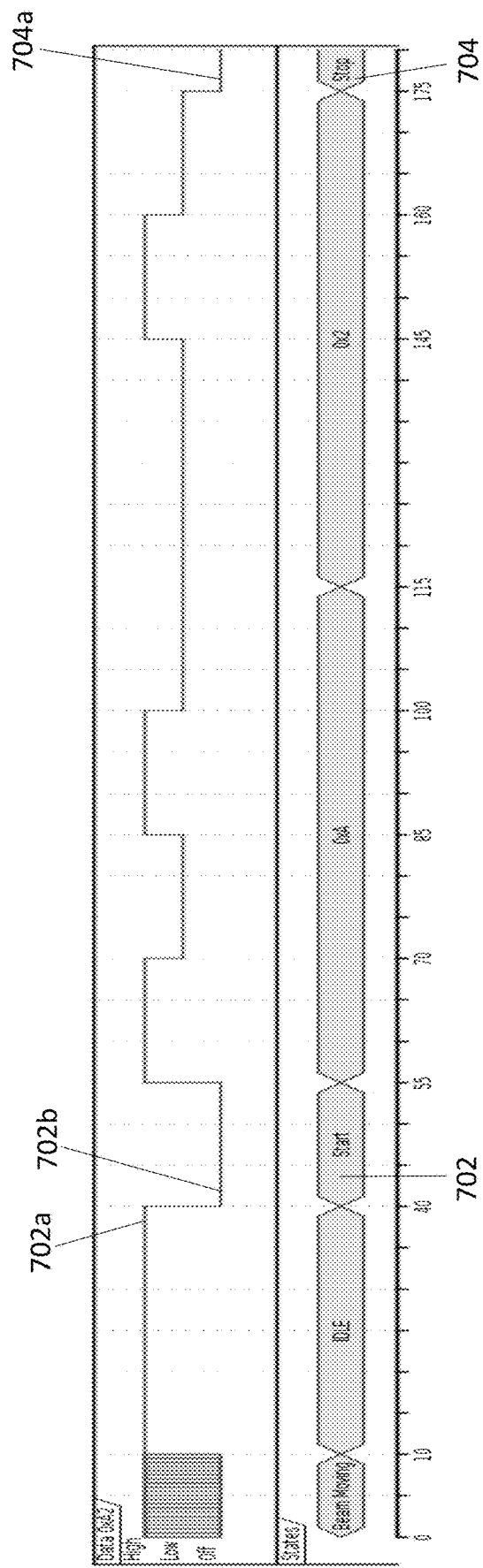
FIG. 7 illustrates a waveform of a sample sequence for sending a data point via the power beam in accordance with an embodiment of the invention.

Encoded data can be transferred from the GU 102 to the RU 500a, 500b with the RF beam used for powering the RU 500a, 500b. In some embodiments, the encoded data can represent the beam ID. In one example, transmitted data can be framed with a start and stop signal via the power beam. FIG. 7 illustrates a waveform of a sample sequence for sending a data point via the power beam in accordance with an embodiment of the invention. The signal may include a start signal 702 and a stop signal 704. The start signal 702 may include changing from a high amplitude (IDLE) signal 702a to low amplitude signal 702b, and the stop signal 704 may include transitioning to a low amplitude signal 704a. The start signal 702 and stop signal 704 may be uniquely identifiable from any intermediate ongoing switching (e.g., beam switching, TDM, etc.) signals to reduce the chances of invalid data. The start signal 702 to stop signal 704 duration may be significantly less than any TDM switching that is occurring for this reason.

To encode the data bits, amplitude modulation can be used to differentiate between 1 and 0 states. Intermediate amplitudes can also be used to allow multiple level signaling. One method of amplitude modulation is obtained by varying the power amplifier output power of each element. Another method of amplitude modulation is obtained by controlling the number of active and off antennas. Another method of amplitude modulation is by defocusing the RF beam. Another method of modulating the amplitude is by shifting the phase of certain antenna elements by 180 degrees. Multiple level signaling can be used to differentiate between start/stop signals and a 0 data bit.

The former will result in very low received power level for bit 0, while the latter provides partial power to the receiver. By making the start/stop signal uniquely identifiable from the data 0, many beams with different power levels can result in data being transmitted and received.

From the high amplitude IDLE state, the approximate power the beam delivers can be measured.

Encoded data transmitted in this way can be combined with a scanning beam to detect any RU in a designated charging zone. The GU may cycle through a pre-defined set of beams that each have a unique value that is transmitted to any RU near the beam location. The RU can detect which data has the highest transmitted power and report that power to the GU. Based on the power measured and the data received by the RU, the GU can calculate where to apply the beam to power the RU. If the RU reports the highest N (where N>1) beam numbers, the GU can use that information to calculate the size of the focal spot and obtain a more exact location and improve the power delivery.

Figure 8:
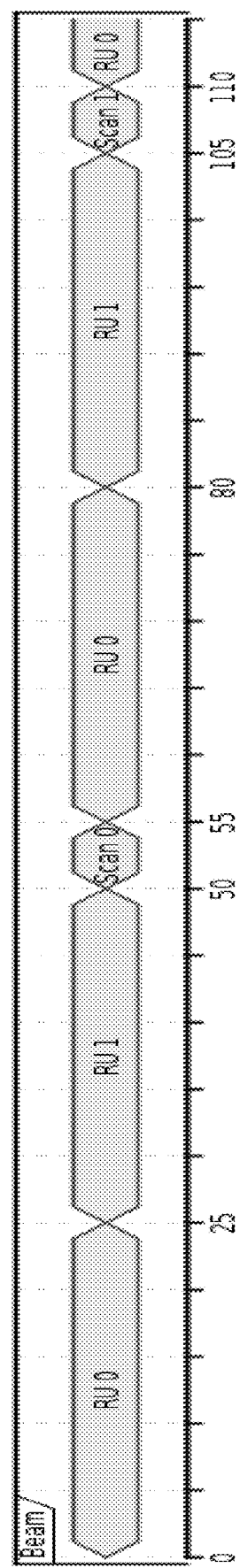
FIG. 8 illustrates a time-division multiplexing (TDM) being used to power multiple RUs in accordance with an embodiment of the invention.

Scan can be ongoing without interrupting the charging of RUs in the charging list. The scan can be interleaved with power beams via time-division multiplexing (TDM) so that multiple RU can be charged while searching for more available RU to power. FIG. 8 illustrates a TDM being used to power multiple RUs in accordance with an embodiment of the invention. The TDM may be used to power 2 RUs which may be labeled "RU 0" and "RU 1" while scanning the charge area for other RU to power. There may be some minimum duration the scan time slot may be ($t_{data}$) for the GU to transmit the full data frame. Any RU receiving power can take up more time than $t_{data}$ to minimize the time not powering an RU. Furthermore, a narrow down scan can be performed after initial location estimation to focus the beam more accurately.

In the case that the received power in one scan is not large enough to power up the new RU entering the charging area, the RU can utilize a power harvesting approach and gradually store energy from several scans. Once the stored energy level reaches the required limit to transmit data, it will activate the transmitter and send the beam data and power level received back to the GU.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A wireless power delivery system comprising:
   a wireless power generation unit (GU) including:
      a GU antenna array; and
      a GU wireless communication circuit; and
   one or more recovery units (RUs), wherein each RU comprises:
      an RU antenna array; and
      an RU wireless communication circuit,
   wherein the GU antenna array is configured to use volumetric refocusing to scan the area for the one or more RUs by sweeping a wireless scan signal to be captured by the RU antenna array,
   wherein volumetric refocusing comprises dynamically moving the focal point of the GU antenna array by applying different phase settings to the wireless scan signal and utilizing a phase table obtained by focusing into a known location and re-calculating the phase settings to refocus the wireless scan signal to a different point in space,
   wherein when the RU antenna array receives the wireless scan signal, the RU wireless communication unit is configured to transmit a wireless signal back to the GU wireless communication unit,
   wherein the GU is configured to record the focal coordinates of each RU based upon the signal received by the GU from each RU, and
   wherein the GU is configured to emit a wireless power signal to the recorded focal coordinates of each RU to be received by each RU antenna array.

2. The wireless power delivery system of claim 1, wherein the GU records the focal coordinates of each RU further based upon when the wireless signal is received by the GU and the beam direction of the wireless scan signal at that time.

3. The wireless power delivery system of claim 1, wherein the GU further includes:
   a processor; and
   memory including machine readable instructions executable by the processor to:
      control the GU antenna array to sweep the wireless scan signal;
      record the focal coordinates of each RU; and
      control the GU antenna array to emit the wireless power signal to the focal coordinates of each RU.

4. The wireless power delivery system of claim 1, wherein at least one of the one or more RUs is a passive device configured to wake up when the wireless scan signal is received and transmit the wireless signal to the GU.

5. The wireless power delivery system of claim 1, wherein at least one of the one or more RUs further comprises an energy storage component capable of powering the RU wireless communication circuit and an RU controller.

6. The wireless power delivery system of claim 5, wherein the RU controller is configured to control the RU wireless communication circuit to transmit the wireless signal back to the GU wireless communication unit.

7. The wireless power delivery system of claim 5, wherein the at least one of the one or more RUs further comprises a power detector which is configured to wake up the RU controller when the wireless scan signal is captured by the RU antenna array.

8. The wireless power delivery system of claim 1, wherein the RU further comprises a power management integrated circuit which is configured to deliver the bower received from the wireless bower signal to a Dowered device.

9. The wireless power delivery system of claim 1, wherein the wireless power signal comprises a start signal and a stop signal.

10. The wireless power delivery system of claim 9, wherein the start signal comprises transitioning from a high amplitude signal to a low amplitude signal.

11. The wireless power delivery system of claim 10, wherein the stop signal comprises transitioning to the low amplitude signal.

12. The wireless power delivery system of claim 11, wherein the low amplitude signal is lower in amplitude than an intermediate ongoing switching.

13. The wireless power delivery system of claim 12, wherein the intermediate ongoing switching comprises beam switching or time-division multiplexing.

14. The wireless power delivery system of claim 1, wherein the re-calculated phase settings include a phase adjustment of:

$$\Delta \psi_{mn} \stackrel{2\pi}{=} \frac{2\pi}{\lambda} \Delta L_{mn}(\vec{R}_0 \vec{R}_1),$$

where antenna m,n in the GU antenna array is used to refocus the wireless scan signal to location $\vec{R}_1$ from a calibration point $\vec{R}_0$, and $\Delta L_{mn}(\vec{R}_0 \vec{R}_1)$ is the length difference of antenna m,n in the array to the calibration point $\vec{R}_0$ and the location $\vec{R}_1$.

15. A method for delivery wireless power, the method comprising:

scanning, using volumetric refocusing, a wireless scan signal from a wireless power generation unit (GU) to be received by one or more recovery units (RUs) wherein volumetric refocusing comprises dynamically moving the focal point of the GU antenna array by applying different phase settings to the wireless scan signal and utilizing a phase table obtained by focusing into a known location and re-calculating the phase settings to refocus the wireless scan signal to a different point in space;

receiving, utilizing the wireless power GU, a wireless signal from each of the RUs;

recording the focal coordinates of each RU based upon the signal received by the GU from each RU; and emitting a wireless power signal from the GU to the recorded focal coordinates to be received by each RU.

16. The method of claim 15, wherein at least one of the one or more RUs is a passive device configured to wake up when receiving the wireless scan signal and transmit the wireless signal to the GU.

17. The method of claim 15, wherein at least one of the one or more RUs comprises an energy storage component and a power detector which is configured to detect the wireless scan signal and wake up the RU to transmit the wireless signal to the GU.

18. The method of claim 15, wherein the wireless power signal comprises a start signal and a stop signal.

19. The method of claim 18, wherein the start signal comprises transitioning from a high amplitude signal to a low amplitude signal.

20. The method of claim 19, wherein the stop signal comprises transitioning to the low amplitude signal.

21. The method of claim 20, wherein the low amplitude signal is lower in amplitude than an intermediate ongoing switching.

22. The method of claim 21, wherein the intermediate ongoing switching comprises beam switching or time-division multiplexing.

* * * * *